Feb. 4, 1958     J. J. CINQUE ET AL     2,822,400
METHYL MERCAPTAN PRODUCTION PROCESS
Filed June 22, 1955
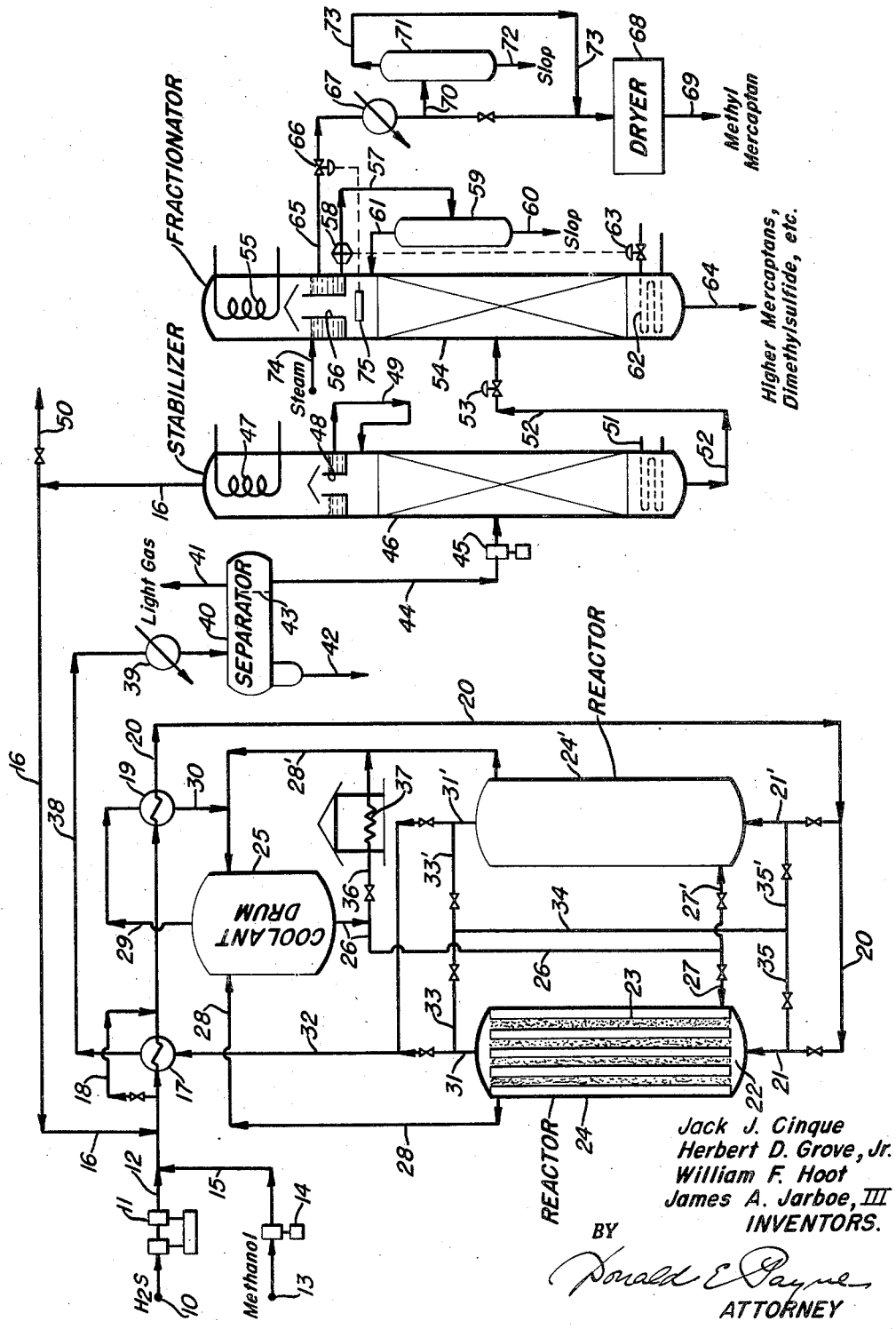
Jack J. Cinque
Herbert D. Grove, Jr.
William F. Hoot
James A. Jarboe, III
INVENTORS.
BY
*Donald E. Payne*
ATTORNEY

United States Patent Office 2,822,400
Patented Feb. 4, 1958

2,822,400

METHYL MERCAPTAN PRODUCTION PROCESS

Jack J. Cinque, Galveston, Herbert D. Grove, Jr., Texas City, William F. Hoot, La Marque, and James A. Jarboe III, Texas City, Tex., assignors to The American Oil Company, Texas City, Tex., a corporation of Texas Application June 22, 1955, Serial No. 517,304

11 Claims. (Cl. 260—609)

This invention relates to an improved process for the production of methyl mercaptan from hydrogen sulfide and methanol and it pertains more particularly to a commercial process for making methyl mercaptan of at least 98 percent purity with minimum losses to by-products such as dimethylsulfide, dimethylether, etc.

While it has long been known that hydrogen sulfide could be reacted with methanol to produce methyl mercaptan (Kramer and Reid, "Catalytic Preparation of Mercaptans," Journal American Chemical Society, 43 (1921), page 880) and while methyl mercaptan is known to be a valuable chemical intermediate for the manufacture of methionine and other useful compounds, the low product yields heretofore attainable (large yields of undesired by-products) and high investment and operating costs have made commercialization of the reaction impracticable. The object of this invention is to provide a practicable commercial method and means for utilizing this known reaction for the production of methyl mercaptan. A further object is to obtain a higher order of methanol conversion and a higher order of selectivity (conversion to methyl mercaptan instead of by-products) than has heretofore been possible. Another important object is to provide a flexible, easily controllable conversion system of minimum investment and operating cost. An ultimate object is to produce from given reactants maximum yields of high purity methyl mercaptan at minimum cost. Other objects will be apparent as the detailed description of the invention proceeds.

In practicing our invention a mixture of hydrogen sulfide and methanol (which mixture may contain dimethylether and a considerable amount of contaminants and/or impurities) is contacted in vapor phase under narrowly defined conditions with a particular type of adsorptive gamma alumina catalyst which has an adsorptive surface area (with respect to nitrogen) of at least 10 but not more than 150 square meters per gram and preferably in the range of about 25 to about 75 square meters per gram. The external hydrogen sulfide: methanol mol ratio, i. e. the ratio of materials charged to the system from outside sources, should be in the range of about 1.1:1 to 2:1 but the total ratio including recycled $H_2S$ should be above 2.5:1 and preferably in the range of 3:1 to 5:1 or more. The temperature should be in the range of about 530 to 670° F., preferably 585 to 635° F., with best results in the range of about 600 to 625° F. The weight space velocity based on total hydrogen sulfide plus methanol entering the reactor should usually be in the range of about .2 to 4 pounds of reactants per hour per pound of catalyst and is preferably about .4 to 2 or approximately 1 pound per hour per pound of catalyst. The conversion pressure should be superatmospheric and in the range of about 100 to 500 p. s. i. g., preferably in the range of about 250 to 350 p. s. i. g.

The temperature and space velocity may vary within the defined narrow ranges depending upon the activity of the particular catalyst employed and/or on the length of time the catalyst has been on-stream but regardless of the temperature in the defined range which is required for effecting the desired conversion with a particular catalyst, it is important that the instantaneous temperature throughout the reactor should be substantially uniform, the temperature variation being always within the limits of plus or minus 20° F. and preferably within the limits of plus or minus 10° F. This uniform temperature is preferably attained by mounting the catalyst in small diameter vertical tubes and surrounding the tubes with a liquid which boils at substantially the desired conversion temperature. An eutectic mixture of phenyl ether and diphenyl (commonly known as Dowtherm) is a good example of such liquid and it may be circulated around the tubes at any desired rate while its boiling temperature is regulated by controlling the pressure in the vaporizing liquid (Dowtherm) system. The maintenance of uniform temperature throughout the catalyst mass in the conversion zone is of great importance in maximizing mercaptan production and minimizing the formation of undesirable by-products. The catalyst at the inlet end of the tubes may be diluted with inert material in order to distribute the reaction more uniformly throughout the reactor and thereby insure greater uniformity of instantaneous temperature.

The process does not require the use of pure hydrogen sulfide but may utilize by-product hydrogen sulfide, e. g. as produced in petroleum refineries, even though the hydrogen sulfide stream may contain 15 or 20 percent of contaminants such as light hydrocarbon gases, carbon dioxide, hydrogen, water vapor, etc. Such by-product hydrogen sulfide should preferably be dried to remove water vapor since there is a tendency particularly in cool weather for the formation of solid $H_2S$ hydrates which are troublesome in that they cause plugging of valves and lines and, particularly, plugging of instrument leads unless, of course, said lines, valves and instrument leads are steam jacketed. While such contaminants and impurities may be tolerated in our system, they are not desirable and while their presence has no appreciable effect on the desired reaction or the desired conversion, they must ultimately be eliminated from the system and such elimination usually results in the loss of $H_2S$, methanol or both.

The operation at pressures in the range of about 250 to 350 p. s. i. g. is of importance from several standpoints. It enables the use of ordinary cooling water for cooling the reactor effluent stream and the separation of light gases from the cooled stream with minimum loss of product or reactant. It reduces the necessary cross sectional area of the reactor tubes which makes possible a closer temperature control and more uniform reactor temperatures. By pumping liquid from the cooled reactor effluent separator to a stabilizer for removing $H_2S$ and other components lower boiling than methyl mercaptan, the removed $H_2S$ stream may be recycled directly to the reactor without need of a compressor.

The importance of operating within the defined conversion conditions will be better understood from a brief discussion of the effect of these conditions on conversion, selectivity, by-product formation, etc. With a 3:1 total hydrogen sulfide:methanol ratio at a pressure of about 350 p. s. i. g. and a temperature of 610° F., almost complete methanol conversion is obtained at a space velocity of .2, about 98 percent at .4, about 92 percent at 1, about 80 percent at 2.5 and about 72 percent at 4 space velocity with a particular catalyst. Increased conversions are obtained with higher temperatures, a temperature of 660° F. giving 92 percent conversion at 2.5 space velocity. Lower temperatures result in lower conversions, a temperature of 580° F. giving a conversion of only about 70 percent at a space velocity of 2.5. It is preferred to operate at a temperature and space velocity which will give a total methanol conversion in the range of about 90 to 98 percent since with our defined catalyst and narrow operating conditions this extent of conversion has been shown to result in maximum selectivity.

The use of large total $H_2S$-methanol ratios minimizes conversion of methanol to dimethylether. The production of this particular by-product is not desired but much of the dimethylether which is formed in the conversion step is separated from product in the stabilizer and recycled to the reactor with the $H_2S$ stream where it reacts as does methanol in the production of further amounts of methyl mercaptan. Under the narrowly defined conditions of this case the amount of dimethylether recycled with the hydrogen sulfide stream may give a methanol to dimethylether ratio in the total reactor feed in the range of about 9:1 to 50:1 although usually the amount of recycled dimethylether is relatively low. The formation of dimethylsulfide is highly undesirable since it decreases the yield of desired product and thereby impairs selectivity; by operating under conditions to give a total methanol conversion of less than 98 percent and by using a high total $H_2S$ to methanol ratio and operating within the defined pressure range, the conversion to dimethylsulfide is minimized. For example, operation at 97 percent methanol conversion with a 1.5:1 hydrogen sulfide to methanol ratio produces about a 20 percent yield of dimethylsulfide while at the same methanol conversion obtained with a 5:1 hydrogen sulfide to methanol ratio the production of dimethylsulfide amounted to less than 6 percent. The actual yield of methyl mercaptan obtainable is enormously augmented by operating under conditions to give a high methanol conversion which is below 98 percent with the use of a high hydrogen sulfide to methanol ratio which is greater than 2:1 and preferably at least 3:1 to 5:1 or more.

The catalyst in our process consists essentially of adsorptive gamma type alumina and it differs from most activated aluminas of commerce by its relatively small surface area. Such catalyst may be prepared by dehydration of alumina trihydrate as is well known to those skilled in the art. For example, a clay of high aluminum oxide content may be digested with concentrated caustic soda solution to form an aqueous solution of sodium aluminate. The gangue is separated from the solution and the solution is then treated with carbon dioxide in the presence of alumina trihydrate crystals as a "seeding" material. The precipitated alumina trihydrate is then dried at relatively low temperatures, i. e. below 400° F., and the dried, partially dehydrated material may be pelleted and calcined at a temperature of about 1000° F. or higher. Activated alumina thus prepared or a commercial activated alumina such as Alcoa Grade F-1 activated alumina usually has a surface area much greater than 150 square meters per gram and it must therefore be treated to decrease the adsorptive surface area. An effective method of decreasing the adsorptive surface area of the alumina is simply to employ it for a period of about 50 hours on stream for effecting conversion of hydrogen sulfide and methanol under conditions hereinabove described. During this initial or catalyst conditioning step an undesirably larger amount of by-products are formed but the adsorptive surface area of the catalyst is diminished from about 225 square meters per gram to about 25 to 75 square meters per gram and, when thus conditioned, the catalyst may be used for weeks and even months in its highly selective state. Other means for treating activated alumina of commerce for obtaining a catalyst having an adsorptive surface area of about 25 to 75 square meters per gram are known to those skilled in the art and require no further detailed description. In determining the surface area of the catalyst, we use the well known "BET" method, a theoretical discussion of which is published by Brunaur et al. in Journal American Chemical Society, volume 60 (February 1938), at page 309. The practical application of the method for using nitrogen absorbate in the manner by which we determine the surface area of the alumina catalyst is described in later articles by Emmett entitled A. S. T. M. Symposium on New Methods for Particle Size Determinations, page 95 (1941) and in Advances in Colloid Science, 1, pages 1-36 (1942).

In addition to features hereinabove set forth, our system includes many operational features of considerable importance such, for example, as the design and operation of the coolant system, the means for obtaining desired product purity in the final fractionator, the safety precautions and the method of disposing of contaminants. While many contaminants can be handled in the system, it is desirable that the system be maintained substantially free from halides and, particularly, chlorides since the latter not only lead to corrosion difficulties but also impair catalyst selectivity.

The invention will be more readily understood from the following description of a specific example thereof read in conjunction with the accompanying drawing which is a schematic flow diagram of an operating commercial unit.

By-product hydrogen sulfide from a petroleum refinery is introduced by line 10 at the rate of about 805 pounds per hour, this hydrogen sulfide stream providing about 680 pounds (20 mols) per hour of hydrogen sulfide and the balance consisting of impurities which are chiefly propylene and propane with lesser amounts of other normally gaseous hydrocarbons and perhaps some carbon dioxide and water although it may be desirable to dry the hydrogen sulfide stream in order to prevent $H_2S$-hydrate difficulties. This stream is compressed to about 300 to 350 p. s. i. by compressor 11 which discharges into line 12. About 557 pounds (17.4 mols) per hour of methanol is introduced from source 13 by pump 14 and line 15 to line 12. A recycle hydrogen sulfide stream is introduced to line 12 by line 16; the composition of this stream may vary but in this example the stream contains about 1,206 pounds (35.4 mols) per hour of hydrogen sulfide, about 40 pounds (.88 mol) per hour of dimethylether and other impurities such as propane, propylene, lighter hydrocarbons, carbon dioxide, etc. Thus the total reactor charge or feed mixture contains about 1,886 pounds (55.4 mols) per hour of $H_2S$, about 557 pounds per hour of methanol and about 40 pounds per hour of dimethylether, 1 mol of the latter being the equivalent of about 2 mols of methanol in the conversion so that while the external mol ratio of $H_2S$ to methanol is about 1.15:1, the ratio in the total reactor charge is about 3:1.

This feed mixture is passed through heat exchanger 17 for absorbing heat from reactor effluent and a controlled amount of the total feed may be by-passed around heat exchanger 17 through controlled by-pass line 18 in order to maintain the desired heat balance in on-stream operation. The preheated feed mixture then passes through heat exchanger 19 wherein it is heated to substantially reaction temperature, e. g. about 600° F., by condensing vapors of the heat transfer liquid which in this example is Dowtherm. The preheated feed mixture then passes by line 20 and valved line 21 to distributing space 22 below catalyst tubes 23 in reactor vessel 24. The catalyst tubes are welded to upper and lower tube headers of the type employed in exchangers and, as will be described, the shell side or spaces between the tubes is filled with heat transfer fluid. Catalyst tubes 23 are preferably of small diameter, 2 inch tubes being preferred, and the internal diameter of the tubes being, in any case, not greater than about 4 inches. Each of the tubes is, of course, provided with suitable catalyst supporting means at its base such as a screen, grid, or pieces of inert material such as silica or fused alumina in the form of spheres, saddles, or the like.

The catalyst is adsorptive gamma alumina and if it has not already been pretreated to give it a surface area below 150 square meters per gram, it may receive the required preconditioning after it is placed in the reactor. In this example the catalyst is a commercial activated alumina (Alcoa grade F-1) in the form of pellets of 8 to 14 mesh size. In the lower section of tubes 23 the catalyst is preferably diluted with particles of inert material such as silica, fused alumina or the like, the inert material constituting about 75 percent of the particles in the lower one-third of the tubes and the upper section of the tubes above this level having a decreasing amount of inert material so that only catalyst is present in the upper part of the tubes. The gradually decreased dilution of the catalyst in the direction of flow produces a more even release of heat throughout the length of the catalyst tubes and helps to maintain the required close temperature control.

Since reaction of hydrogen sulfide with methanol is exothermic, a liquid heat transfer medium such as an eutectic mixture of phenyl ether and diphenyl (Dowtherm) surrounds catalyst tubes 23 in the shell side of vessel 24. A large mass of this heat transfer liquid or coolant is maintained in drum 25, the coolant liquid flowing by gravity through line 26 and valved line 27 to the shell side of vessel 24 immediately above the lower tube header and vapors of the coolant liquid being returned by line 28 to the upper part of coolant drum 25. Vapors from the coolant drum pass by line 29 through exchanger 19 wherein they are condensed and are returned to the drum by line 30.

We prefer to employ a 2-reactor system so that the preheated feed mixture may be introduced by valved line 21' through the tubes in vessel 24', the reactor effluent being passed from the top of reactor 24 through line 31 and/or from reactor 24' through line 31' to the combined product effluent line 32. By closing the valve in line 31, opening the valve in line 33 (the valve in line 33' being closed) the effluent from reactor 24 may be passed through line 34 and line 35' to reactor 24' so that the reactors may be operated in series as well as in parallel. Similarly, the effluent from reactor 24' may pass through lines 33', 34 and 35 to reactor 24 so that the series flow may be in either direction. With the catalyst diluted as hereinabove described, it is preferred to operate the reactors in parallel so that one reactor may be taken off stream for regeneration or replacement of catalyst in the other reactor and/or for operation during periods when it is desired to operate at only half capacity.

The defined catalyst has a remarkably long catalyst life and even after many weeks on-stream it apparently suffers no appreciable loss in activity or selectivity. In view of the low cost of the catalyst it is therefore preferred to simply replace the catalyst charge if and when this should become necessary. If catalyst is regenerated by burning off deposits with flue gas-diluted air, it may be necessary to again condition the catalyst to the defined low surface area before resuming full on-stream operations.

In this example the space velocity based on total $H_2S$ plus methanol (and methanol equivalent of dimethylether) is about 0.6 pound per hour of feed per pound of catalyst (0.75 based on total reactor charge), the pressure is about 300 to 350 p. s. i. and the temperature is about 610° F. Throughout the length of the catalyst tubes the catalyst temperature is within 20° F. (plus or minus) and preferably within 10° F. of said 610° F. If the activity of the catalyst declines after appreciable on-stream periods, it may be desirable to raise the reaction temperature to 625° F. or to a higher temperature within the defined range but, in any case, the instantaneous temperature throughout the reaction zone should be uniform in order to avoid excessive by-product production. The boiling point of the coolant liquid may be varied by increasing or decreasing the pressure in said system, temperatures of the order of 600 to 630° F. being readily attained by employing pressures of the order of about 30 to about 60 p. s. i. g.

In starting up the process it is desirable that the coolant liquid such as Dowtherm be brought to the desired reaction temperature by passing it by line 36 to heater 37 and returning coolant vapors to the upper part of drum 25 through line 28'. The hot coolant liquid should be passed through the shell side of the reactors in order to bring the entire reaction chamber to desired temperature before the mixed feed gases are introduced thereto. When on-stream conditions have been established, heater 37 is not necessary and the liberated heat from the exothermic reaction is actually in excess of that required to compensate for heat losses and for preheating introduced charge so that a controlled amount of introduced charge is by-passed around exchanger 17 as hereinabove stated.

The total reactor effluent after passing through heat exchanger 17 is passed by line 38 to cooler 39 wherein the effluent is cooled to temperatures attainable with available cooling water, i. e. at least to 140° F. and preferably to about 100° F., and the cooled effluent is introduced into separator 40 which is operated at substantially reaction zone pressure. The condensate separates into two immiscible liquids, an aqueous phase containing dissolved hydrogen sulfide and also containing minor amounts of unreacted methyl alcohol, methyl mercaptan, etc. and a methyl mercaptan phase containing large amounts of dissolved hydrogen sulfide and lesser amounts of water, dimethylsulfide, methanol, dimethylether, etc. The uncondensed gas is removed from the separator by line 41 so that hydrogen, carbon monoxide, carbon dioxide, light hydrocarbon gases, etc. may be purged from the system. The use of pressures higher than 200 p. s. i. g. and preferably at least about 250 to 350 p. s. i. g. are desirable for minimizing $H_2S$ loss through this light gas purge. $H_2S$ losses at this point may be further decreased by providing further cooling of gases discharged through line 41 to provide a reflux system or by scrubbing these gases with a cooled portion of the methyl mercaptan stream. The aqueous layer is withdrawn through line 42.

The light liquid or methyl mercaptan layer which flows over weir 43 in the separator is withdrawn through line 44 and pumped by pump 45 into stabilizer tower 46, the pump 45 maintaining the pressure of stabilizer 46 about 50 pounds higher than reactor pressure so that the $H_2S$ stream which leaves the top of the stabilizer may be recycled to the reactor without compression. In this example the stabilizer is operated at a top pressure of about 350 to 385 p. s. i. g. with a top temperature of about 124° F. and a bottom temperature of about 260 to 290° F. The main section of the 16 inch diameter stabilizer is preferably packed with ½ inch stone ware Raschig rings. The top temperature is controlled by cooling coil 47 which provides reflux condensate which is collected in trap-out pan 48 and returned by line 49 above the packed section of the tower. The overhead from the stabilizer is recycled by line 16 to the incoming feed mixture as hereinabove described although a part of this hydrogen sulfide stream may be vented through line 50 in an amount sufficient to prevent build-up of contaminants. The materials vented from lines 41, 42 and 50 are directed to a waste disposal furnace (not shown) provided to burn all by-product streams at a temperature of about 2000 to 2200° F. to insure complete combustion of all sulfur compounds to sulfur dioxide and the sulfur dioxide is subsequently discharged to the atmosphere to a stack which is preferably at least about 140 feet high. As a further safeguard against air contamination from leaks within the unit, essentially all construction joints, including valves, are welded, bellows-type packing is employed in relief valves and control valves, Teflon packing is employed in process valves, centrifugal pumps are equipped with mechanical seals and auxiliary packing with void space vented to the high temperature furnace, hydrogen sulfide compressor distance pieces are enclosed and vented to the furnace and relief valves are connected to the furnace.

While a coil reboiler 51 is illustrated at the bottom of stabilizer 46, it will be understood that any other suitable heating means may be provided.

Stabilizer bottoms are withdrawn from the base of stabilizer 46 through line 52 and introduced through pressure reducing valve 53 to fractionator 54 which in this example is a 14 inch column the main portion of which is packed with Raschig rings of the type employed in the stabilizer. Fractionator 54 is operated with a top pressure of about 64 p. s. i. g. and a top temperature of about 130° F. is maintained by cooling coil 55 positioned at the top of the fractionator above trap-out pan 56. Condensed liquid is withdrawn from the bottom of trap-out pan 56 through line 57 to an orifice plate 58 which measures the rate of liquid flow in line 57, said liquid then being introduced to separator 59 from which separated aqueous phase may be withdrawn through line 60 as slop. The methyl mercaptan liquid phase is returned by line 61 to fractionator 54 above the packed section as reflux liquid. A fractionator bottom temperature in the range of about 140 to 200° F. is maintained by a reboiler steam coil 62, the steam inlet being controlled by valve 63 either manually or automatically in accordance with reflux flow rate through orifice plate 58. Components higher boiling than methyl mercaptan are withdrawn from the fractionator through line 64, this stream containing higher mercaptans, dimethylsulfide, etc.

The methyl mercaptan product stream is withdrawn from the fractionator by line 65 at a rate controlled by valve 66, this stream being cooled in heat exchanger 67 and then passed through drying system 68 before removal to storage through line 69. When the methyl mercaptan stream is cooled in exchanger 67 an aqueous phase may be thrown out of solution and it is therefore preferred that the cooled methyl mercaptan stream be passed by line 70 to separator 71 so that additional aqueous phase may be discarded through line 72 as slop and the methyl mercaptan phase may be introduced by line 73 to dryer 68. The dryer 68 is preferably a set of calcium chloride drums so that the product may be passed through one of said drums while calcium chloride is being replaced in the other. Separator 71 may be packed with glass fibers or other suitable coalescing material to improve the effectiveness of aqueous phase separation.

To improve the effectiveness of methanol separation in the upper part of the fractionator, steam is introduced thereto through line 74 at a rate, in this example, of about 50 pounds per hour. The simultaneous condensation of steam, methanol and mercaptan on cooling coils 55 has been found to markedly improve the separation of methanol from methyl mercaptan product, the aqueous phase being withdrawn through line 57 along with methyl mercaptan reflux and the aqueous phase being discarded as slop through line 60 as hereinabove described. To further improve product purity a differential vapor pressure cell 75 is mounted in the vapor space of the fractionator below trap-out pan 56, one side of said cell being exposed to the vapor space in the tower and the other side to a bulb containing product of desired purity. The rate of product removal through line 65 is controlled either manually or automatically by valve 66 in accordance with the vapor pressure differential indicated by cell 75. In commercial operation of the system hereinabove described a methyl mercaptan product is obtained of which the following is a typical inspection:

Typical analyses, mol percent
| | |
|---|---|
| Methyl mercaptan | 98.56 |
| Hydrogen sulfide | .09 |
| Carbon disulfide | .23 |
| Ethyl mercaptan | .09 |
| Methanol | .09 |
| Isopropyl mercaptan | .03 |
| Dimethylsulfide | .12 |
| Dimethylether | .79 |

Cloud point −40° F.

While a specific example of our invention has been described in considerable detail, it should be understood that alternative arrangements and operating conditions within the defined ranges will be apparent from the above description to those skilled in the art. For example, a fluid catalyst system may be employed instead of the heat exchange type fixed bed reactor system since fluid systems are known to provide remarkably uniform instantaneous temperature throughout the reaction zone; Dowtherm heat exchange tubes extending within the fluidized reactor bed could be employed for maintaining the temperature at any desired level. The reactor tubes may be provided with fins or other heat conducting means to improve conduction of heat for assuring more uniform instantaneous temperature throughout the reactor. Other modifications of this type may be employed.

We claim:

1. In the method of making methyl mercaptan which comprises contacting in vapor phase a mixture of hydrogen sulfide and methanol with an activated alumina catalyst having an adsorptive surface area (with respect to nitrogen) in the range of about 10 to 150 square meters per gram, employing an external hydrogen sulfide:methanol mol ratio in the range of about 1.1:1 to 2:1 and a total ratio in the range of 2.5:1 to 5:1 in the contacting step, effecting the contact at a temperature in the range of about 530 to 670° F. under superatmospheric pressure in the range of about 100 to 500 p. s. i. g. with a space velocity in the range of about .2 to 4 pounds of total hydrogen sulfide plus methanol and methanol equivalent per hour per pound of catalyst, said methanol equivalent consisting of dimethylether and each mol of the latter being equivalent to 2 mols of methanol on a weight basis, and maintaining a substantially uniform instantaneous temperature throughout the reaction zone, the improvement which comprises cooling effluent from the reaction zone to a temperature below 140° F. to effect condensation of an aqueous phase and a methyl mercaptan phase, venting uncondensed gases from condensate formed in the cooling step and removing the aqueous phase from the methyl mercaptan phase, introducing the methyl mercaptan phase to a stabilizer zone and therein separating hydrogen sulfide and other components lower boiling than methyl mercaptan, recycling the hydrogen sulfide stream to the reaction zone inlet and fractionating liquid from the base of the stabilizer zone for removing high boiling impurities from the methyl mercaptan.

2. The method of claim 1 which includes venting a part of the hydrogen sulfide recycle stream to purge low boiling contaminants from the system.

3. The method of claim 1 which includes the step of pumping separated methyl mercaptan condensate to the stabilizer zone for maintaining the stabilizer zone at a sufficiently higher pressure than the reaction zone so that the hydrogen sulfide recycle stream may be returned to the reaction zone without compression.

4. In the method of making methyl mercaptan which comprises contacting in vapor phase a mixture of hydrogen sulfide and methanol with an activated alumina catalyst having an adsorptive surface area (with respect to nitrogen) in the range of about 10 to 150 square meters per gram, employing an external hydrogen sulfide:methanol mol ratio in the range of about 1.1:1 to 2:1 and a total ratio in the range of 2.5:1 to 5:1 in the contacting step, effecting the contact at a temperature in the range of 530 to 670° F. under a pressure in the range of about 250 to 350 p. s. i. g. with a space velocity in the range of about .2 to 4 pounds of total hydrogen sulfide plus methanol and methanol equivalent per hour per pound of catalyst, said methanol equivalent consisting dimethylether and each mol of the latter being equivalent to 2 mols of methanol on a weight basis, and maintaining a substantially uniform instantaneous temperature throughout the reaction zone, the improvement which comprises cooling reaction zone effluent by heat exchange with at least a part of the reactor feed stock, further cooling the reactor effluent to a temperature below 140° F. to effect condensation of methyl mercaptan phase and an aqueous phase, removing uncondensed gas and aqueous phase from condensed methyl mercaptan phase, pumping the methyl mercaptan phase to a stabilizer zone maintained at a pressure higher than that of the reaction zone, distilling in said stabilizer zone components lower boiling than methyl mercaptan and recycling at least a part of said lower boiling components to the reaction zone by pressure difference between these zones, fractionating in a fractionating zone liquid withdrawn from the stabilizer zone to separate methyl mercaptan from higher boiling components and drying the methyl mercaptan obtained in the fractionating step.

5. The method of claim 4 which includes the steps of condensing vapors in the upper part of the fractionating zone, returning condensate to serve as reflux liquid in the fractionating zone and controlling the heat input to the base of the fractionating zone in accordance with the rate of flow of reflux liquid.

6. The method of claim 4 which includes the step of controlling the rate at which methyl mercaptan product liquid is withdrawn from the fractionating zone in accordance with the difference between the vapor pressure in the top of said zone and the vapor pressure of methyl mercaptan of desired purity.

7. The method of claim 4 which includes the steps of introducing steam at the upper part of the fractionating zone whereby said steam is condensed along with methyl mercaptan vapors and any methanol contained therein as an impurity, withdrawing condensed methyl mercaptan and aqueous condensate from the upper part of the fractionating zone, separating aqueous condensate from the withdrawn mixture and returning condensed methyl mercaptan as reflux to said fractionating zone.

8. The method of claim 4 which includes the step of operating the fractionating zone at a pressure of 60 to 65 p. s. i. g. and maintaining a top temperature in the fractionating zone in the range of about 120 to 135° F.

9. The method of claim 4 wherein the drying of methyl mercaptan is effected by cooling the methyl mercaptan product stream from the fractionating zone to effect separation of an aqueous phase, removing said aqueous phase from the remaining cooled stream and contacting the remaining cooled stream with a desiccant.

10. In the method of making methyl mercaptan which comprises contacting in vapor phase a mixture of hydrogen sulfide and methanol with an activated alumina catalyst having an adsorptive surface area (with respect to nitrogen) in the range of about 10 to 150 square meters per gram, maintaining the catalyst during said contacting step at substantially uniform temperature in the range of about 530 to 670° F. throughout the reaction zone by close indirect heat exchange with a coolant liquid whereby the exothermic heat of reaction effects boiling of said coolant liquid, the improvement which comprises condensing coolant liquid vapors by indirect heat exchange thereof with preheated incoming charging stock, preheating said charging stock by heat exchange with reaction zone effluent and by-passing a part of the charging stock around the preheating step and controlling the amount of by-passed charging stock for effecting control of the heat balance of the system.

11. In the method of making methyl mercaptan which comprises contacting in vapor phase a mixture of hydrogen sulfide and methanol with an activated alumina catalyst having an adsorptive surface area (with respect to nitrogen) in the range of about 10 to 150 square meters per gram, maintaining the catalyst during said contacting step at substantially uniform temperature in the range of about 530 to 670° F. throughout the reaction zone by close indirect heat exchange with a coolant liquid whereby the exothermic heat of reaction effects boiling of said coolant liquid, the improvement which comprises condensing coolant liquid vapors by indirect heat exchange thereof with preheated incoming charging stock and directly heating coolant liquid to the extent required for initially bringing the reaction zone up to a predetermined reaction temperature in the range of 530 to 670° F. and for supplying any further heat required in the conversion zone over and above that liberated by exothermic heat of reaction.

References Cited in the file of this patent

UNITED STATES PATENTS

| | | |
|---|---|---|
| 2,667,515 | Beach et al. | Jan. 26, 1954 |
| 2,685,605 | Bell | Aug. 3, 1954 |